Dec. 4, 1945. R. J. ENGLER 2,390,242
ARTICLE TRANSFERRING APPARATUS
Filed March 1, 1945 2 Sheets-Sheet 1

Inventor
Robert John Engler
By Semmes Keegin Beale & Semmes
Attorneys

Dec. 4, 1945. R. J. ENGLER 2,390,242
ARTICLE TRANSFERRING APPARATUS
Filed March 1, 1945 2 Sheets-Sheet 2

Inventor
Robert John Engler
By Semmes, Keegin, Beale & Semmes
Attorneys

Patented Dec. 4, 1945

2,390,242

UNITED STATES PATENT OFFICE 2,390,242

ARTICLE TRANSFERRING APPARATUS

Robert John Engler, Beaver Dam, Wis., assignor of one-fourth to H. M. Seippel, as trustee for Peter J. Seippel, Beaver Dam, Wis.

Application March 1, 1945, Serial No. 580,314

4 Claims. (Cl. 294—65)

This invention relates to improvements in article transferring apparatus, and has particular reference to a suction apparatus for lifting and transferring groups of containers arranged in predetermined relation to each other, from one canning operation to another.

Ordinarily, canning processes do not constitute a continuous operation. For this reason, such processes frequently require the cans, at the completion of one or more of the steps of the process, to be transferred from one point to another.

Heretofore, this transference of cans has been a hand operation which was laborious and time consuming. For example, after the containers are closed, in the canning of vegetables, they are conveyed to the retort on a double conveyor from which they must be removed and placed in retort crates. As previously mentioned, this transference has been a hand operation which required the attention of several men who had to be frequently relieved because of the strenuous nature of the work.

One of the objects of the present invention is to avoid the above mentioned disadvantages in the prior art.

More specifically, the object of the present invention is to provide a suction apparatus for transferring a plurality of containers, arranged in predetermined relation, from one canning operation to another.

With these and other objects in view, which will be subsequently described, the present invention relates to a suction apparatus for transferring a plurality of containers, arranged in predetermined relation, from one point to another. The apparatus comprises a frame which constitutes a manifold for a plurality of suction devices designed to engage an equal number of cans arranged in predetermined relation. The frame is provided with a lifting handle and means for attaching the apparatus to a source of suction. A vacuum control valve mounted in juxtaposed relation to the handle is provided to control the application of suction and preferably the apparatus is counterweighted to facilitate lifting the containers to enable them to be readily transferred. The suction devices are arranged on the manifold to correspond to the predetermined relation of the cans which are to be transferred.

The drawings disclose two forms of apparatus which may be used to effect the objects of the present invention.

In the two forms of the invention, which have been shown for purposes of illustration, the apparatus comprises a horizontally extending frame, generally indicated by the numeral 1, upon which is mounted a vertically extending structure 2. The members forming this structure are operatively connected to a source of vacuum by means of a flexible conduit 3.

Figure 2:
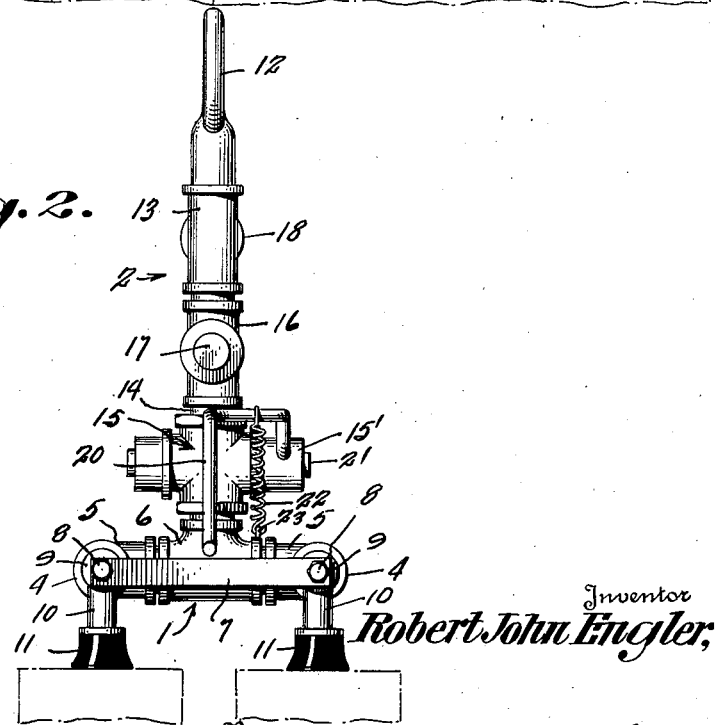
Figure 2 is an elevational view of one end of the same.

The frame 1 comprises a pair of manifolds 4, which are disposed in parallel relation. Each of these manifolds 4 consists of a pair of axially aligned pipes which are connected by a T-shaped pipe fitting 5. As best shown in Figure 2, these fittings 5 are connected by a single T-shaped pipe fitting 6 which forms the means of operatively connecting the manifolds 4 to the vertical structure 2.

The manifolds 4 are also joined at their extremities by metallic strips 7 which are secured by cap screws 8 to plugs 9. These plugs are mounted in the extremities of the pipes which form the manifolds 4 and serve as closure members.

The lower edge of each of the manifolds 4 is provided with a plurality of spaced apertures into which downwardly extending nipples 10 are threaded. An inverted and downwardly extending suction cup 11 is secured to the extremity of each of these nipples 10.

Each of these suction cups 11 is designed to engage closely a surface of a container from a group arranged in predetermined relation. They may be of any design and material which will prevent the loss of suction. The illustrated cups 11 are of a flexible plastic material, such as rubber. However, a suction cup of hard material may be used if the outer edge is provided with a rubber flange or other yielding means which will closely engage the surface of the container and thereby prevent the loss of suction.

Figure 1:
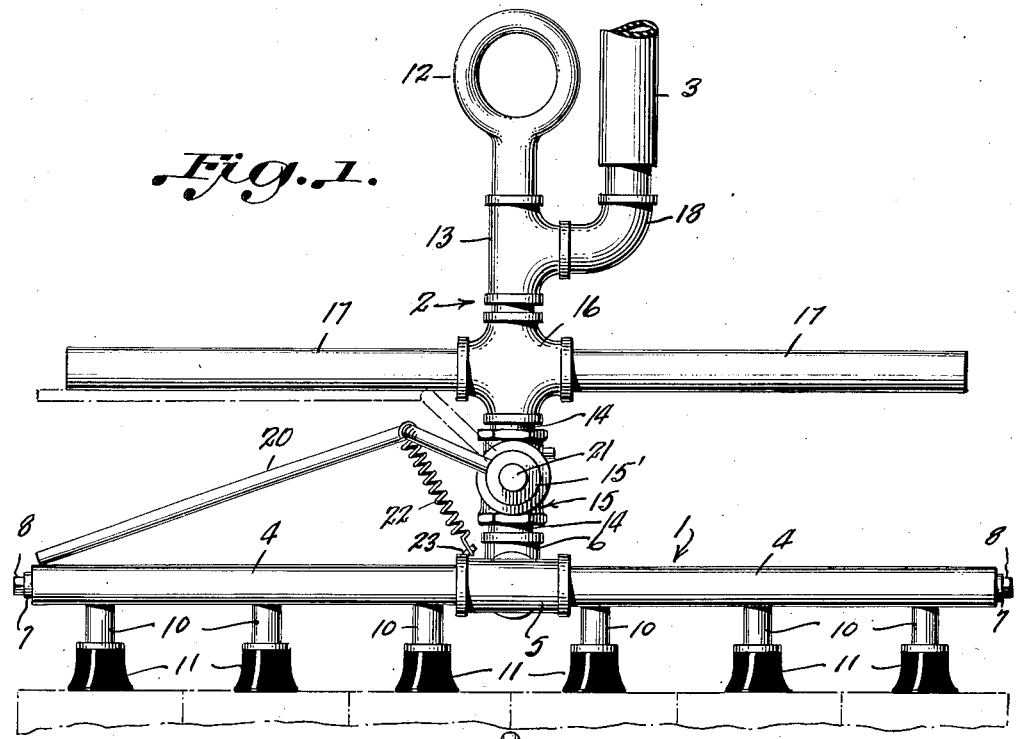
Figure 1 is a side elevational view of one form of the can transferring device.

In the form of the invention shown in Figures 1 and 2, the vertical portion 2 of the suction apparatus comprises an eye bolt 12 vertically mounted on a T-shaped pipe coupling 13, which is connected to a pipe coupling 14, containing a two-way valve 15, by a cross-shaped pipe fitting 16. This vertical structure is operatively connected to and supported by the T-shaped fitting 6.

A pair of horizontally extending handles 17 are also carried by the cross-shaped fitting 16 and the apparatus is connected to the source of vacuum by an elbow 18 which operatively connects the conduit 3 with the fitting 13. The apparatus may also be connected to a weight lifting mechanism, such as a counterweight, by means of the eye bolt 12.

In this form of the invention, the two-way valve 15 is provided with an operating lever 20, one extremity of which is mounted on an external collar 15' secured to the stem of a rotatable plug member 21 of the valve 15. The outer portion of the lever 20 is offset so that it will be positioned directly beneath one of the operating handles 17 and will lie parallel thereto when the valve is open. This positioning of the lever 20 conveniently enables the operator to open the valve 15 without releasing his grip upon either of the operating handles 17 and assures that the valve will remain open while the containers are being lifted and transferred. A spring 22 which connects the lever 20 to a tab 23, projecting from one of the T-shaped pipe fittings 6, is designed to return the lever to a closed position when it is released.

Figure 4:
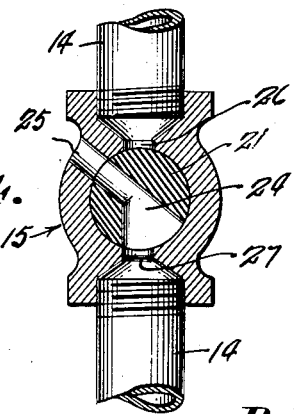
Figure 4 is a transverse sectional view of the control valve, which is used on both of the illustrated forms of the invention.

As best shown in Figure 4, the two-way valve 15, which is used on both forms of the invention, is provided with a passageway 24, in the rotatable member 21, one extremity of which is flared. In the closed position shown in Figure 4, the passageway 24 serves to connect the apparatus with a bleed port 25 in the valve casing and place the manifolds and suction cups in communication with the atmosphere when the operating lever 20 is in released position. When the member 21 is rotated by raising the lever 20, opposed ports 26 and 27 of the valve are connected which connects the manifolds 4 and cups 11 with the source of vacuum and permits suction to be applied to the surfaces of the cans which are in contact with the suction cups 11.

Figure 3:
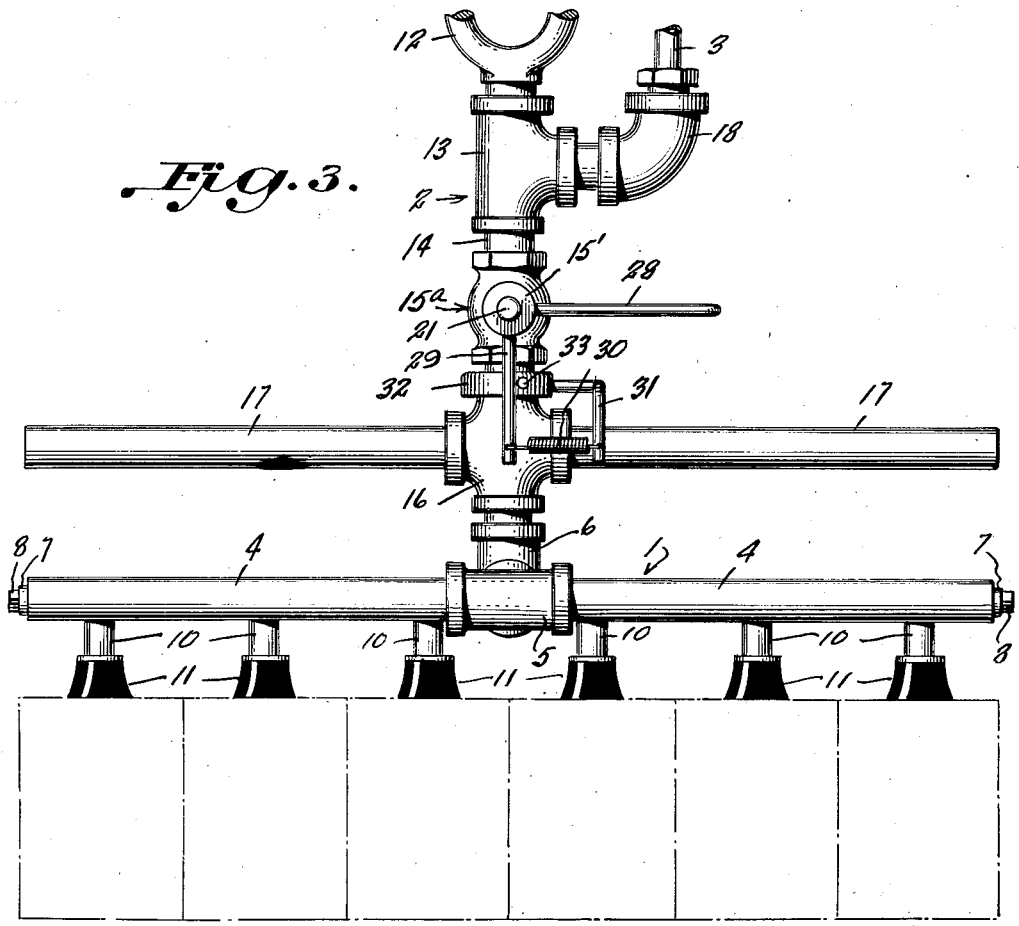
Figure 3 is a side elevational view of a second form of the can transferring device.

The second form of the invention shown in Figure 3 is similar to that shown in Figures 1 and 2 except that in this form the two-way valve 15a is mounted above the operating handles 17.

In order that the valve 15a may be readily operated without releasing either of the handles 17, the valve operating assembly in this form of the invention comprises a pair of levers 28 and 29 which are mounted at right angles to each other on the collar 15'. The lever 28 is positioned above one of the handles 17 and is maintained in a horizontal position as a result of the tension exerted by a spring 30 which connects the lever 29 with a bracket 31. As shown in Figure 3, this bracket 31 is mounted on a fitting 32 which forms a collar adjacent the cross-shaped member 16. The collar 32 also carries an abutment 33 to limit the movement of the lever 29.

In operation the suction cups 11 are brought into close fitting contact with the surfaces of the cans by applying pressure upon the handles 17. The valve 15 is then opened by rotating the member 21. This can be performed in the first form of the invention by raising the lever 20 in the manner previously described. In the second form of the invention the lever 28 is depressed to open the valve.

This opening of the valve 15 joins the manifolds 4 and the vertical structure 2 into a continuous conduit, thereby connecting the suction cups 11 to the source of suction. As a result of this force the containers are securely attached to the respective suction cups 11.

This enables the operator to transfer the containers from one point to another after which they may be released by releasing the operating lever, thereby allowing the valve to close. The apparatus is then readily returned to the initial starting point and lowered to bring the suction cups 11 into contact with a new group of cans arranged in predetermined order. These operations can be assisted by attaching the eye bolt 12 to a suitable weight lifting mechanism, such as a counterweight.

From the foregoing description it will be appreciated that the present invention provides an improved means for transferring containers from one point to another during canning. This improvement constitutes a distinct advance because of the substantial saving of time and labor effected after the completion of a canning operation which requires transference of cans from one form of conveyance to another.

While, in the foregoing description, reference has been made to particular material, apparatus and conditions, it should be understood that the invention is not specifically limited thereto but may be varied to include equivalent apparatus and conditions.

For example, although both forms of the invention disclose a single type of valve and the use of a pair of manifolds disposed in parallel relation, it is obvious that any suitable type of valve may be used and that the structure of the manifold may be varied to adapt the apparatus for any given predetermined arrangement of the cans. Moreover, the shape and material of the suction cups 11 and the means for attaching these cups to the manifold may be varied to enable the apparatus to be adapted to changing conditions.

I claim:

1. An apparatus for transferring a plurality of cans arranged in predetermined relation from one point to another comprising a pair of manifolds disposed in parallel relation, the lower portion of each manifold defining a plurality of spaced openings, a transversely extending T-shaped pipe fitting operatively connecting the said manifolds adjacent their center portions, a pair of braces joining corresponding extremities of the manifold together to further strengthen the structure, a vertically positioned coupling, containing a two-way vacuum control valve, connected to the said T-shaped fitting, a cross-shaped pipe fitting mounted on the said coupling and supporting a pair of laterally extending handles, a second T-shaped pipe fitting vertically mounted in the said cross-shaped fitting and supporting an eye-shaped ring by which the device may be attached to a weight lifting mechanism, means for connecting the remaining orifice of the said second T-shaped fitting to a source of suction, a spring tensioned lever connected to the said vacuum control valve, said lever being capable of opening the said valve when raised to a position against one of the handles, a nipple mounted in each of the spaced openings of the said manifold, and an inverted and flexible suction cup carried by the lower end of each of the nipples, said cups being arranged to correspond to said predetermined relation of the cans to be transferred so that each may engage a surface of a can, whereby suction can be applied to said engaged surfaces by opening the said control valve.

2. An apparatus for transferring a plurality of cans arranged in predetermined relation from one point to another comprising a pair of manifolds disposed in parallel relation, the lower portion of each manifold defining a plurality of spaced openings, a transversely extending T-shaped pipe fitting operatively connecting the said manifolds adjacent their center portions, a pair of braces joining corresponding extremities of the manifold together to further strengthen the structure, a cross-shaped pipe fitting operatively connected with the remaining orifice of the said T-shaped fitting, a pair of laterally extending handles mounted in the cross-shaped fitting, a vertically extending coupling mounted on the cross-shaped fitting, said coupling containing a two-way suction control valve, a second T-shaped pipe fitting vertically mounted on the coupling and supporting an eye-shaped ring by which the device may be attached to a weight lifting mechanism, means for connecting the remaining orifice of the said second T-shaped fitting to a source of suction, a spring tensioned lever connected to the said vacuum control valve, a nipple mounted on each of the spaced openings of the said manifold, and an inverted and flexible suction cup carried by the lower end of each of the nipples, said cups being arranged to correspond to said predetermined arrangement of the cans to be transferred so that each may engage the surface of a can, whereby suction can be applied to such engaged surfaces by opening the said control valve.

3. An apparatus for transferring a plurality of cans arranged in predetermined relation from one point to another comprising a pair of manifolds disposed in parallel relation, the lower portion of each manifold defining a plurality of spaced openings, a transversely extending T-shaped pipe fitting operatively connecting the said manifolds adjacent their center portions, means to further strengthen the structure, a vertically positioned coupling, containing a two-way vacuum control valve, connected to said T-shaped fitting, a cross-shaped pipe fitting mounted on the said coupling and supporting a pair of laterally extending handles, a second T-shaped pipe fitting vertically mounted in the said cross-shaped fitting and supporting means, by which the device may be attached to a weight lifting mechanism, means for connecting the remaining orifice of the said second T-shaped fitting to a source of suction, a spring tensioned lever connected to the said vacuum control valve, said lever being capable of opening the said valve when raised to a position against one of the handles, a nipple mounted in each of the spaced openings of the said manifold, and an inverted and flexible suction cup carried by the lower end of each of the nipples, said cups being arranged to correspond to said predetermined relation of the cans to be transferred so that each may engage a surface of a can, whereby suction can be applied to said engaged surfaces by opening the said control valve.

4. An apparatus for transferring a plurality of cans arranged in predetermined relation from one point to another comprising a pair of manifolds disposed in parallel relation, the lower portion of each manifold defining a plurality of spaced openings, a transversely extending T-shaped pipe fitting operatively connecting the said manifolds adjacent their center portions, means to further strengthen the structure, a cross-shaped pipe fitting operatively connected with the remaining orifice of the said T-shaped fitting, a pair of laterally extending handles mounted in the cross-shaped fitting, a vertically extending coupling mounted on the cross-shaped fitting, said coupling containing a two-way suction control valve, a second T-shaped pipe fitting vertically mounted on the coupling and supporting means, by which the device may be attached to a weight lifting mechanism, means for connecting the remaining orifice of the said second T-shaped fitting to a source of suction, a spring tensioned lever connected to the said vacuum control valve, a nipple mounted on each of the spaced openings of the said manifold, and an inverted and flexible suction cup carried by the lower end of each of the nipples, said cups being arranged to correspond to said predetermined arrangement of the cans to be transferred so that each may engage the surface of a can, whereby suction can be applied to such engaged surfaces by opening the said control valve.

ROBERT JOHN ENGLER.